(12) United States Patent
Trettin et al.

(10) Patent No.: US 6,910,837 B2
(45) Date of Patent: Jun. 28, 2005

(54) LOCKSET DRILLING GUIDE

(75) Inventors: David J. Trettin, Charlotte, NC (US); Richard M. Davidian, Weddington, NC (US); Laverne Durfee, Harmony, NC (US); Kristofor M. Hallee, Huntersville, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 39 days.

(21) Appl. No.: 10/629,959

(22) Filed: Jul. 30, 2003

(65) Prior Publication Data

US 2004/0131435 A2 Jul. 8, 2004

Related U.S. Application Data

(60) Provisional application No. 60/407,485, filed on Aug. 30, 2002.

(51) Int. Cl.[7] .............................................. B23B 49/00
(52) U.S. Cl. ........................ 408/115 B; 408/1 R; 408/97
(58) Field of Search ...................... 408/97, 103, 115 R, 408/241 B, 1 R

(56) References Cited

U.S. PATENT DOCUMENTS

| | | | | |
|---|---|---|---|---|
| 917,488 | A | * | 4/1909 | Roberts ...................... 408/109 |
| 996,597 | A | | 6/1911 | Cooper |
| 1,210,942 | A | * | 1/1917 | Jones ......................... 408/104 |
| 2,033,072 | A | * | 3/1936 | Harp ........................... 408/97 |
| 2,268,930 | A | * | 1/1942 | Edwards ..................... 408/103 |
| 2,798,520 | A | | 7/1957 | Maskulka et al. .......... 145/129 |
| 2,838,966 | A | * | 6/1958 | Campbell ............... 408/115 R |
| 3,008,359 | A | | 11/1961 | Mackey ......................... 77/62 |
| 3,212,366 | A | | 10/1965 | Russell et al. ................ 408/97 |
| 4,280,776 | A | | 7/1981 | Chaconas et al. ......... 408/72 R |
| 4,331,411 | A | | 5/1982 | Kessinger et al. ............ 408/97 |
| 4,715,125 | A | | 12/1987 | Livick ......................... 33/197 |
| 4,813,826 | A | | 3/1989 | Riedel ......................... 408/108 |
| 5,114,285 | A | | 5/1992 | Brydon .................... 408/115 R |
| 5,222,845 | A | | 6/1993 | Goldstein et al. ........... 408/103 |
| 5,407,307 | A | * | 4/1995 | Park ........................ 408/115 R |
| 5,569,001 | A | | 10/1996 | Brutscher et al. ........ 408/115 R |
| 5,573,352 | A | | 11/1996 | Matadobra ................... 409/132 |
| 5,762,115 | A | | 6/1998 | Shouse ................... 144/144.51 |
| 5,791,834 | A | | 8/1998 | Zehrung ..................... 408/1 R |
| 5,915,891 | A | | 6/1999 | Fridman |
| 6,186,708 | B1 | | 2/2001 | Fridman |
| 6,193,449 | B1 | | 2/2001 | Diaz ....................... 408/115 R |
| 6,343,632 | B1 | | 2/2002 | Zivojinovic .................. 144/27 |
| 6,390,738 | B1 | | 5/2002 | Fridman |
| 6,398,465 | B1 | | 6/2002 | Monge ........................ 408/1 R |
| 6,659,695 | B2 | * | 12/2003 | Park ........................... 408/103 |

FOREIGN PATENT DOCUMENTS

| | | | | |
|---|---|---|---|---|
| GB | 2072488 | * | 8/1982 | ............ 408/115 R |
| GB | 2 219 763 A | | 3/1989 | |
| GB | 2 229 391 A | | 10/1989 | |

* cited by examiner

Primary Examiner—Daniel W. Howell
(74) Attorney, Agent, or Firm—Dennis J. Williamson; Moore & Van Allen, PLLC

(57) ABSTRACT

A lockset drilling guide and a method of forming holes in a door are provided. The drilling guide includes a frame and at least a first opening and a second opening defined in the frame. The first opening is positioned at approximately 90 degrees to the second opening. The frame is configured for positioning on a door to facilitate the forming of openings in a door for the installation of a lockset. The method includes the steps of providing a frame having at least a first opening and a second opening defined in the frame; positioning the frame on an edge of the door; inserting a first holesaw at least partially into the first opening and drilling a first hole in the door; inserting a second holesaw at least partially into the second opening and drilling a second hole in the door; and removing the frame from the door.

19 Claims, 6 Drawing Sheets

LOCKSET DRILLING GUIDE

This application claims priority to U.S. application Ser. No. 60/407,485, filed Aug. 30, 2002, pending, which is incorporated in its entirety herein.

FIELD OF THE INVENTION

The present invention relates to carpentry tools. In particular, the present invention relates to a drilling guide for facilitating the drilling of holes in a door for the installation of standard locksets.

BACKGROUND

Standard-sized door handle locksets are used to latch and secure hinged doors to a doorjamb-mounted strikeplate. These locksets typically require the drilling of a large, throughgoing hole in the face of the door and a perpendicularly-extending, smaller hole in the edge of the door. Additional holes must be drilled in the edge of the door to retain the latchplate. The lockset and door handles are mounted to both sides of the larger hole, and the latchplate and cylinder latch are mounted to the smaller hole on the edge of the door.

Typically, the center of the larger hole, which is located in the face of the door, must be either 2-3/8 or 2-3/4 inches from the edge of the door, depending on the type or brand of lockset to be installed. To facilitate the drilling of the holes in the door, most of such locksets include a paper template that the installer may affix to the door to mark the drilling holes for the lockset.

These paper templates have significant shortcomings, however. First, the non-durable templates must be taped to the door, and this may become a tedious task for carpenters who are charged with installing many locksets at a jobsite. Furthermore, because of the stretching of the template or the possibility of misaligning it on the door with the wrong marking line, it is very possible that one or more of the holes may be marked in the wrong location. The fact that interior doors typically are configured in at least two popular thicknesses (1-3/8" and 1-3/4") adds to the difficulty in accurately positioning the template. In addition to these problems with the template, it is often difficult to drill holes in the door edge and face that are perfectly aligned with their central axes perpendicular to each other. Such misalignment or misplacement may result in a poorly fitting lockset or a lockset that fails to properly engage the strikeplate on the door jamb. At worst, an entire door can be ruined and may need to be completely discarded if the holes are drilled improperly.

A particularly inexperienced user may even use the wrong size holesaw or paddle bit when using either of these template methods, thereby resulting in a large hole of an incorrect size. If the hole is too small for the lockset yet too large for the pilot drill of a holesaw, it may be impossible for the proper-sized holesaw to enlarge the hole accurately on center of the previous hole. A similar problem will arise when enlarging a preexisting lockset hole in a previously drilled door, in that it is extremely difficult to center the larger holesaw over the center of a preexisting hole. Because newer locksets typically require a 2-1/8 inch hole in the face of the door instead of the previously popular 1-7/8 inch hole, this has become an increasing problem.

In the past, some have attempted to solve some of the inaccuracy problems in lockset installation through the use of a more durable plastic template that allows the drilling of pilot holes in the door. Such a template is shown in U.S. Pat. No. 4,280,776. While the plastic template disclosed therein may have some advantages over a paper template, the tool is still prone to most of the inaccuracy problems discussed above. Furthermore, by only allowing the marking or drilling of pilot holes, additional time-consuming steps must be taken in preparing and drilling each door.

BRIEF SUMMARY OF THE INVENTION

In order to address one or more of the shortcomings discussed above, a lockset drilling guide is provided herein. In one embodiment and one aspect of the invention, a frame is provided having a first opening and a second opening. The first opening is positioned at approximately 90 degrees to the second opening. The frame is configured for positioning on a door to facilitate the forming of openings in the door for the installation of a lockset.

In another embodiment of the invention, a drilling guide having an angular frame for positioning along the edge of a door is provided. The frame includes at least a first and a second opening defined in the frame wherein the openings are positioned relative to each other to guide the drilling of a corresponding first and second set of holes in a door having perpendicularly extending axes. The frame comprises at least one spacing tab mountable to the drilling guide, each of the at least one tabs is flexibly attached to the frame via at least one strap.

Another embodiment of the present invention includes a drilling guide with an L-shaped frame for positioning along the edge of a door. A first cylindrical opening is defined in the frame having a first axis and second cylindrical opening is defined in the frame having a second axis. The first and second axes intersect at approximately 90 degrees to each other. The openings are configured to guide correspondingly sized holesaws for forming holes in the door. The drilling guide includes at least one spacing tab for spacing the frame a predefined distance from the door.

Another embodiment of the present invention includes a drilling guide having an L-shaped frame having a first flange and a second flange mounted perpendicularly thereto. The flanges define first and second rear faces. A first circular opening is defined in the first flange, the first opening includes a first annular lip and a second circular opening is defined in the second flange, the second opening including a second annular lip. A plurality of spacing tabs are flexibly attached to the frame, the tabs being removably mountable to the rear faces.

In another embodiment of the present invention, a method is provided for forming holes in a door. The method comprises the steps of providing a frame having at least a first opening and a second opening defined in the frame, the first opening being positioned at approximately 90 degrees to the second opening; positioning the frame on an edge of the door; inserting a first holesaw at least partially into the first opening and drilling a first hole in the door, inserting a second holesaw at least partially into the second opening and drilling a second hole in the door; and removing the frame from the door.

In another embodiment of the present invention, a method is provided for forming holes in a first and a second door. The method includes the steps of providing an angular frame having at least a first opening and a second opening defined in the frame, the frame including a plurality of spacing tabs mountable thereto; positioning the frame on an edge of the first door; forming openings in the first door guided by the first and second openings; and removing the frame from the first door. The method further includes the steps of mounting the spacing tabs to the frame; positioning the frame on an edge of the second door; and forming openings in the second door guided by the first and second openings.

In an embodiment of the present invention, an apparatus is provided for drilling holes in a door for the mounting of a lockset. The apparatus comprises an angular frame for positioning along the edge of the door; a first cylindrical opening defined in the frame having a first axis and a second cylindrical opening defined in the frame having a second axis. The first and second axes intersect at approximately 90 degrees to each other. The apparatus further comprises at least one holesaw blade sized to fit within at least one of the openings and at least one spacing tab mountable to the frame for spacing the frame a predefined distance from the door.

In another embodiment of the present invention, a method is provided for mounting a lockset on a door. The method includes the steps of providing a frame member having an L-shaped cross section; attaching the frame member to the door by driving at least one first fastener through the frame member into the edge of the door; forming an opening for the mounting of the lockset using the frame member as a guide; removing the at least one first fastener and the frame from the door; and mounting the lockset in the opening.

Other objects and advantages will be apparent from the following description of the invention, and the various features of that invention will be particularly pointed out in conjunction with the preferred embodiments. As realized, the invention is capable of other and different embodiments, and its details are capable of modification in various respect. Accordingly, the drawings and description are to be regarded as illustrative in nature and not as restrictive.

BRIEF DESCRIPTION OF SEVERAL VIEWS OF THE DRAWINGS

The present embodiments of the invention are illustrated in the accompanying drawings wherein.

DETAILED DESCRIPTION OF THE PREFERRED EMBODIMENTS

Figure 1:
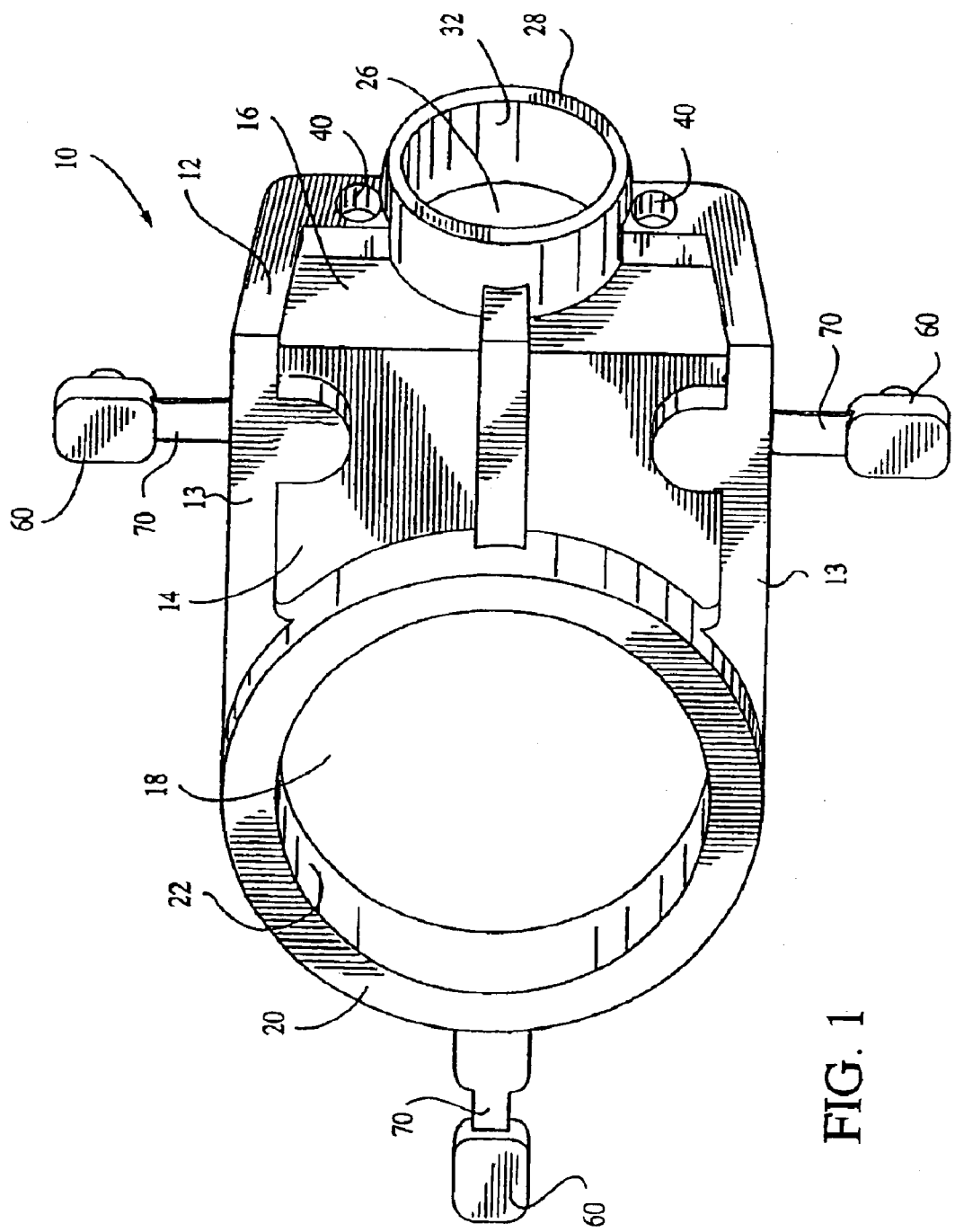
FIG. 1 is a perspective view of a first embodiment of the lockset drilling guide in accordance with the present invention.
Figure 2:
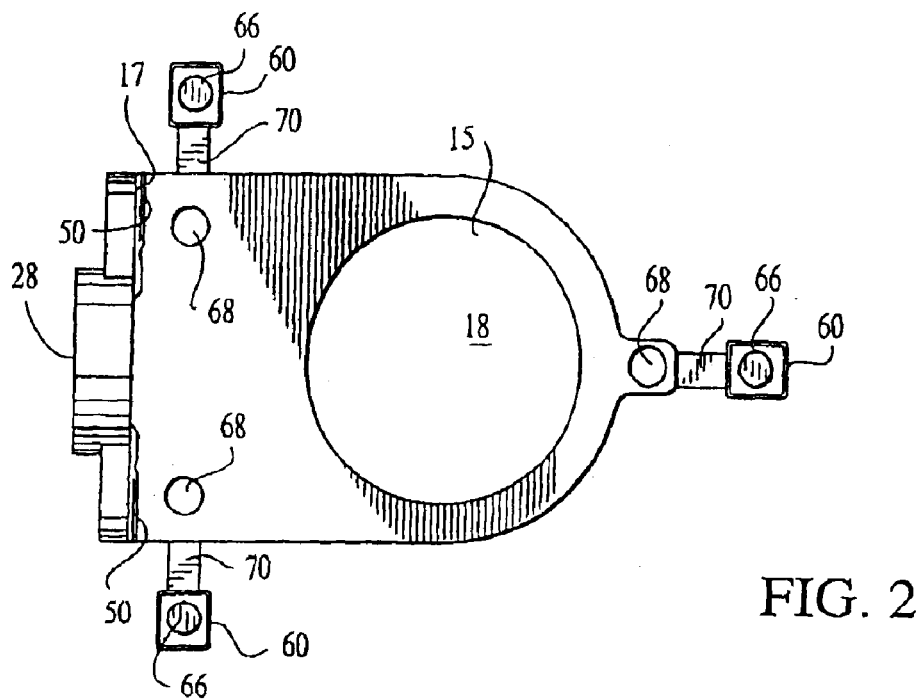
FIG. 2 is a front elevational view of FIG. 1.
Figure 3:
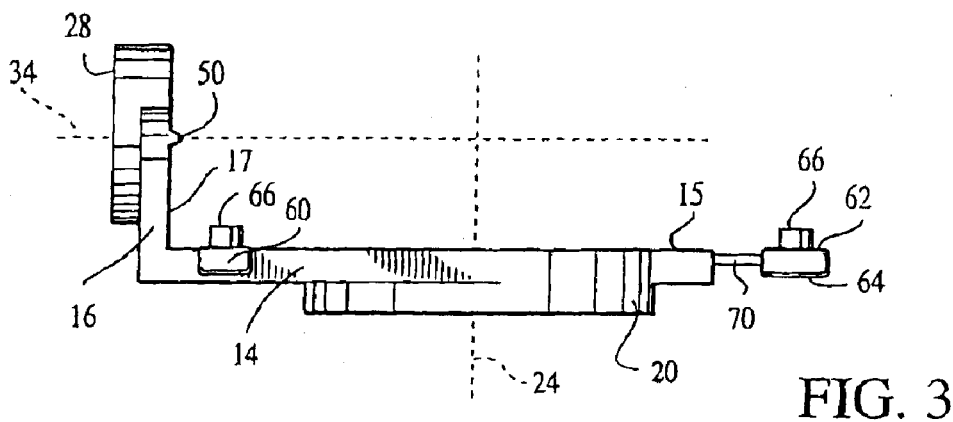
FIG. 3 is a top elevational view of FIG. 1.

A preferred embodiment of the invention is shown as a drilling guide 10 having a frame 12 as shown in the various views of FIGS. 1–5. The frame 12 is generally L-shaped in that the frame 12 includes a first flange 12 and a second flange 16 positioned relative to each other at a 90° angle. The first flange 14 preferably defines a generally flat, planer rear face 15 and a second flange 16 preferably defines a generally flat rear face 17. A pair of upstanding, elongated spacing ridges 50 are provided along the rear face 17 of the second flange 16 to account for positioning along beveled door edges. The first flange 14 preferably defines a first circular opening 18 surrounded by an annular lip 20 that is configured as an upstanding right-cylindrical section. The annular lip 20 defines a right cylindrical wall 22 on the interior of the opening. It is preferred that the annular lip 20 upstands in a direction opposite that of the rear face 15 so that the rear face 15 remains generally flat. Preferably, the right cylindrical wall 22 defines a first central axis 24 that is generally perpindicular to the plane of the rear face 15 of the first flange 14, as best seen in FIG. 3.

Figure 4:
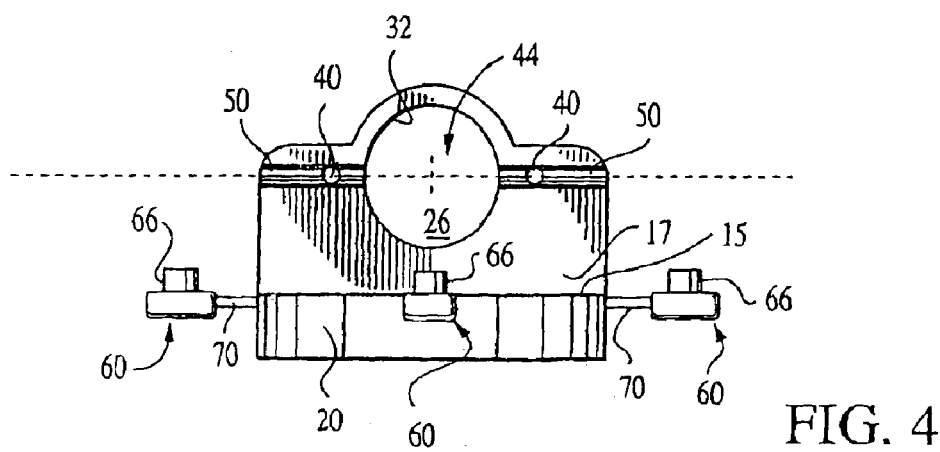
FIG. 4 is a left-side elevational view of FIG. 1.
Figure 5:
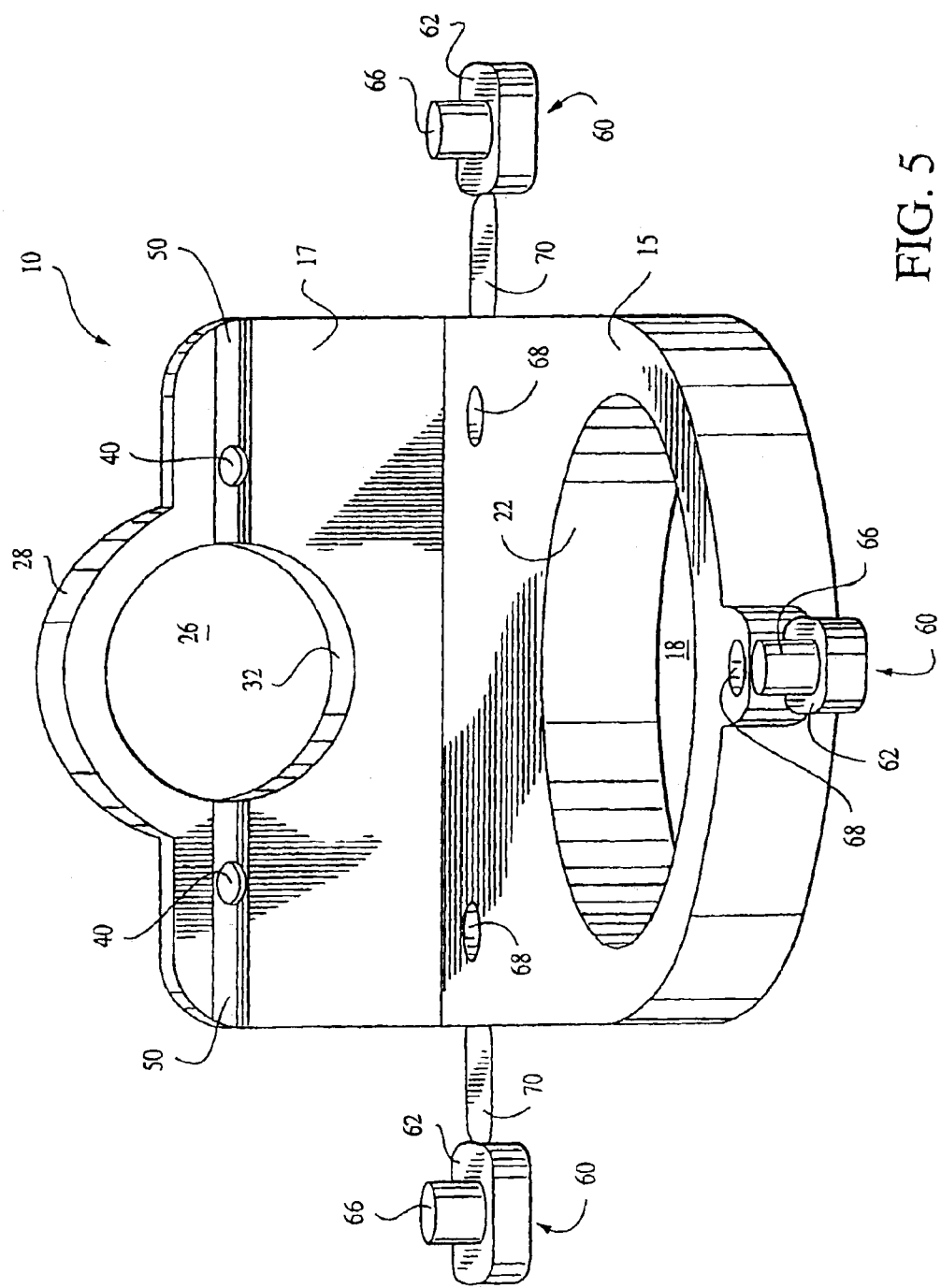
FIG. 5 is a perspective view of the lockset drilling guide of FIG. 1 showing the rear portion thereof.

The second flange 16 preferably defines a second opening 26 surrounded by an annular lip 28. The annular lip 28 preferably upstands in an opposite direction from the rear face 17 of the second flange 16, and, like the annular lip 20, extends in a right-cylindrical section from the flange 16. The annular lip 28 preferably defines a right cylindrical wall 32 on the interior of the second opening 26. The right cylindrical wall 32 preferably defines a second central axis 34 that extends perpendicularly to the rear face 17 of the second flange 16 as shown best in FIG. 3. Thus, as shown in FIG. 3, the axes 24 and 34 of the first opening 18 and the second opening 26, respectively, intersect at a 90° angle. The second flange 16 also preferably defines a pair of through-going mounting openings 40 that are positioned to surround the second opening 26. Preferably, the centers of the mounting openings 40 are aligned with the center 44 of the second opening 26 as shown in FIG. 4. Preferably, the mounting openings 40 are positioned relative to the second opening 26 on the second flange 16 to correspond to similar latch plate mounting openings on standard latch plates.

Preferably, the right cylindrical wall 22 defining the first opening 18 is 2-⅛ inches in diameter, and the right cylindrical wall 32 of the second opening 26 is 1 inch in diameter. In one embodiment, these measurements allow the right cylindrical wall 22 of the first opening 18 to closely surround and guide a standard holesaw having a 2-⅛ inch diameter within the opening 18 so that the saw remains generally perpendicular to the rear face 15 during the drilling process.

Similarly, the right cylindrical wall 32 of the opening 26 closely surrounds and is able to guide a smaller standard-sized holesaw for drilling a hole of 1 inch in diameter, thus keeping the holesaw perpendicular to the rear face 17 during the drilling process.

Figure 7:
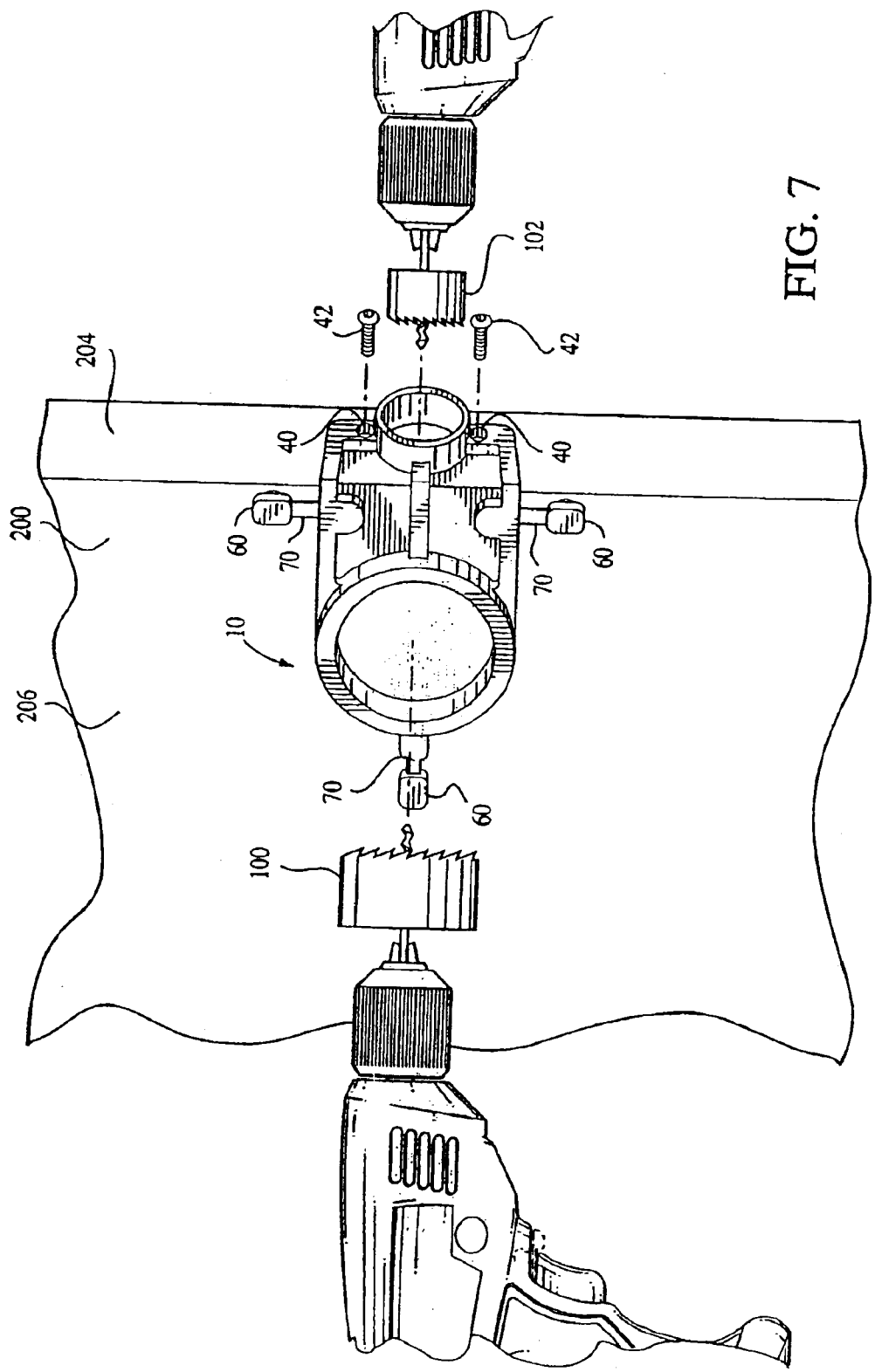
FIG. 7 is a perspective view of the embodiment shown in FIG. 1 installed on the edge of a door and showing various aspects of the lockset installation process.
Figure 8:
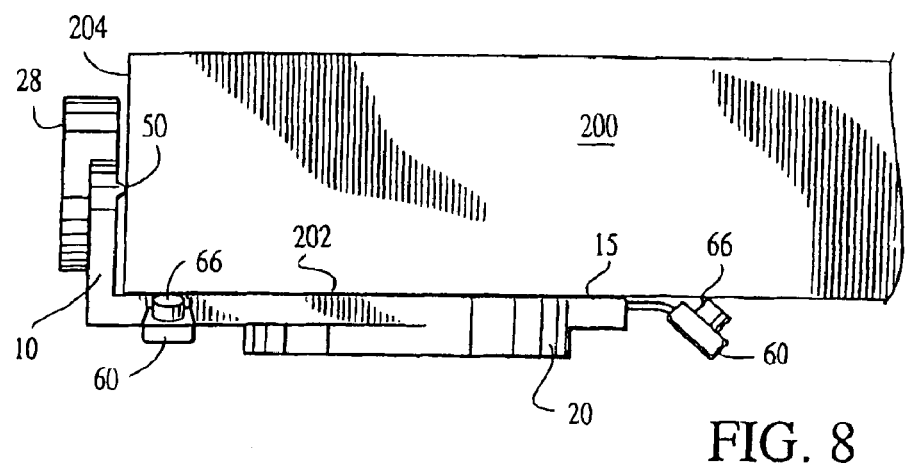
FIG. 8 is a top elevational view similar to that of FIG. 3 showing the installation of the drilling guide on a standard, non-beveled door.

FIG. 7 shows the forward edge of a door 200 that is being prepared for drilling. FIG. 7 also illustrates the holesaws 100 and 102 adjacent the openings 18 and 26, respectively, on the drilling guide 10 positioned on an undrilled door 200. The door 200 preferably includes a door face 202 and a door edge 204. As shown in the drawing, the drilling guide 10 may be mounted to the door 200 so that the rear face 15 of the first flange 14 is positioned flush to the door face 202 and the spacing ridges 50 on the rear face 17 of the second flange 16 are positioned against the door edge 204. This is shown in FIG. 8. The drilling guide 10 may be mounted to the door edge 204 using a pair of screws 42 inserted through the mounting openings 40 in the second flange 16. Preferably, in the preferred embodiment, the screws 42 may be the same screws that are provided with a conventional lockset. Conveniently, once the drilling process is completed and the drilling guide 10 is removed from the door 200, the screws 42 may be reused to attach the latch plate to the door edge 204. The area surrounding the newly drilled opening will of course require a section properly mortised to fit the latch plate (not shown).

Figure 9:
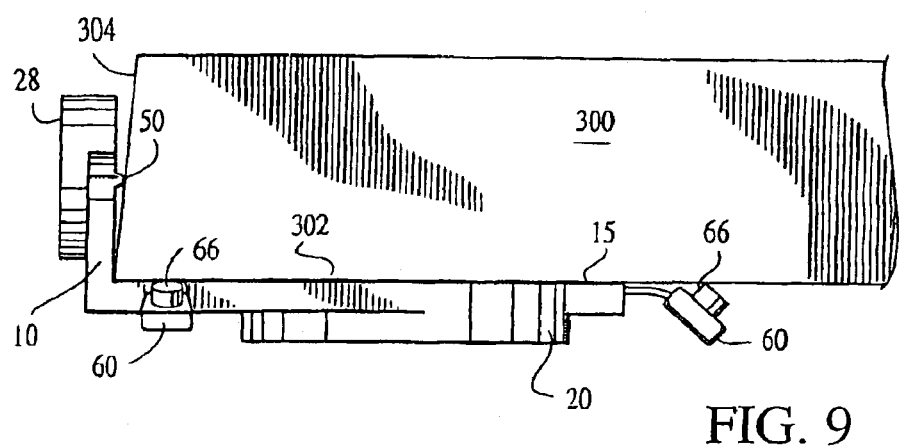
FIG. 9 is an elevational view similar to that of FIGS. 3 and 8 showing the installation of the drilling guide on a beveled door.

When the drilling guide 10 is mounted with the frame 12 against a conventional-edge door 200, the spacing ridges 50 are positioned against a flat door edge 204. The proper positioning of the rear face 15 of the first flange 14 against the door face 202 allows the plane of the rear face to be properly aligned perpendicularly to the door edge 204, and the center line 44 of the opening 26 aligned with the center line of door edge 204. This is shown in FIGS. 7 and 8. When the drilling guide 10 is properly positioned on the door 200, wherein the door is of a non-beveled edge configuration, the spacing ridges 50 are positioned on the edge 204 of the door as shown in FIG. 8. In the event that the door includes a beveled edge 304 as shown in FIG. 9, the spacing ridges 50 properly provide stability to the second flange 16 and engage the beveled edge 304 of the door 300.

Because the most often-used interior door sizes have thicknesses of 1-⅜ inches and 1-¾ inches, the drilling guide of the present invention may be adjusted for use on doors having at least these two thicknesses. In the preferred embodiment, the rear face 15 of the first flange 14 is placed flush against the face 202 of the door 200 for a 1-¾ inch thick standard door as shown in FIG. 8. On thinner 1-⅜ inch doors, it is desirable to adjust the guide so that the center line 44 of the second opening 26 on the flange 16 is still properly positioned along the center line of the edge of the thinner door. In order to accommodate this adjustment, a plurality of removable spacing tabs 60 are provided in the preferred embodiment. Preferably, the spacing tabs 60 are defined with generally parallel opposed surfaces 62 and 64. The surface 62 of each tab 60 preferably includes an upstanding peg 66 that is sized to removably engage a corresponding opening 68 on the rear face 15 of the first flange 14. Preferably, each of the spacing tabs 60 is flexibly attached by an integral, flexible strap 70 to the frame 12. In the preferred embodiment, the three spacing tabs 60 are provided around the periphery of the first flange 14. The straps 70 may be integrally molded of the same plastic or may include molded-in or co-molded elastomeric rubber to provide more flexibility.

Figure 6:
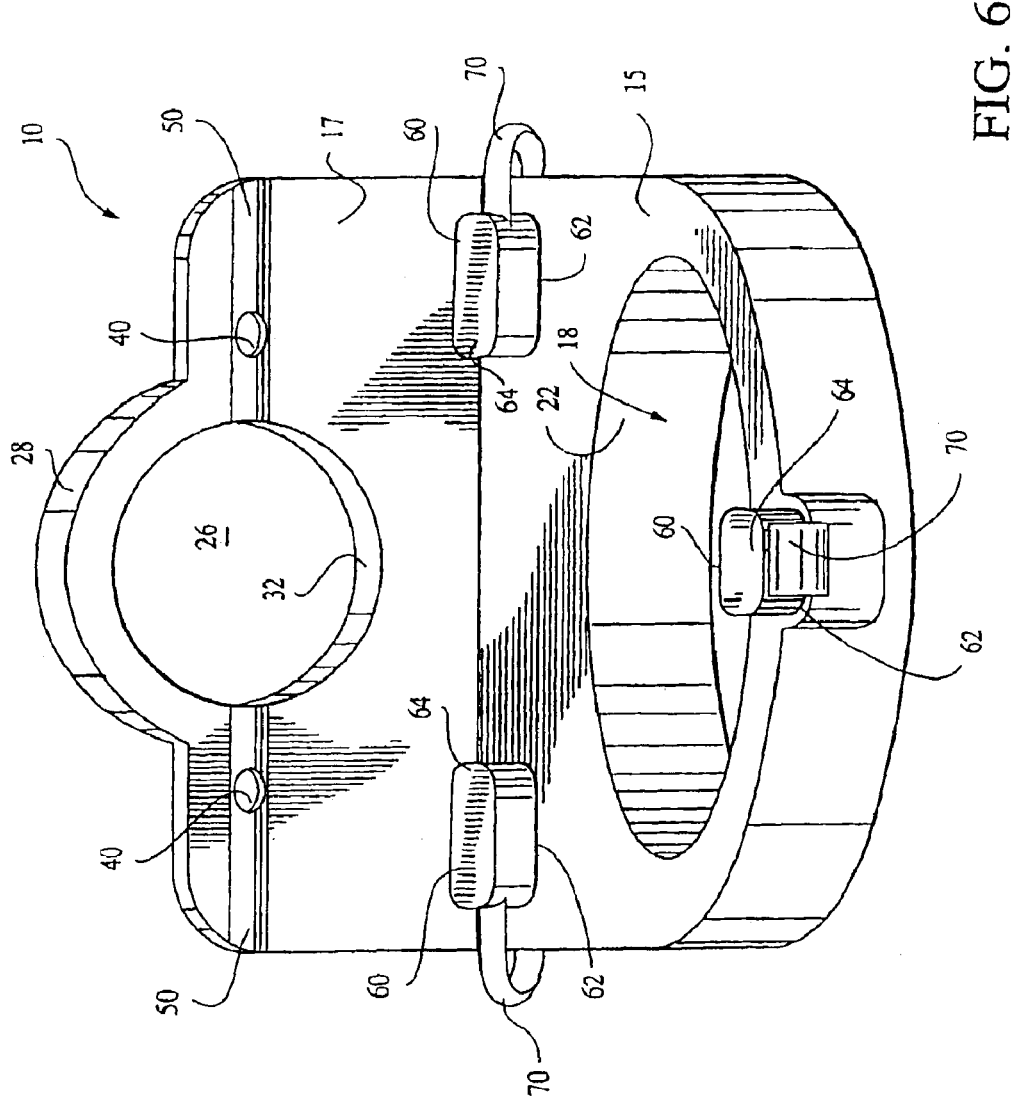
FIG. 6 is a perspective view similar to that of FIG. 5, showing the adjustment tabs positioned and installed on the frame of the preferred embodiment.

In use, when it desired to use the drilling guide 10 on a door of reduced standard thickness, the tabs 60 may be inserted into each corresponding opening 68 in the rear face 15 as shown in FIG. 6. The thickness of the tab 60, in particular the distance between the opposed surfaces 62 and 64, raises the first flange 14 slightly above the face of the door on which it is installed. Thus, the drilling guide 10 contacts the face of the reduced-thickness door only via the surfaces 64 of the tabs 60 in this configuration. This is shown in the top view of FIG. 10, which illustrates the mounted guide 10 on a thinner door 400.

When it is desired to re-use the drilling guide 10 on a door of increased standard thickness such as the door 200 shown in FIG. 8, the tabs 60 may be removed from the openings 68 and used as described above. Note that in FIG. 8, the spacing tabs 60 are allowed to flex away from the face 202 of the door 200 when the guide 10 is mounted thereto. Thus, the drilling guide 10 may be quickly reconfigured for use on various standard-sized doors.

It should be noted that further adjustment options may be implemented in the preferred embodiment to allow use of the drilling guide 10 on doors of a variety of thicknesses. For example, a plurality of tabs of differing thicknesses may be provided for use on doors having a variety of thicknesses. Furthermore, the first opening 18 and the second opening 26 may be modified to receive properly sized holesaws, and the collars may also include an upstanding annulet or flange that varies the spacing between the rear 15 and the face of the door. Other alternative structures may of course be provided within the scope of the invention.

In use, to enlarge existing lockset holes or otherwise drill lockset holes in a blank door, the user need only take a few simple steps. First, the user will set the drilling guide 10 for the proper door thickness. If used on a thicker door such as the door 200 first, the spacing tabs 60 will be removed and remain unengaged from the face 15 of the first flange 14 as shown in FIGS. 1–5 and 7–8. The drilling guide 10 is then positioned at the appropriate height on the door 200 as shown in FIG. 7. Attachment screws 42 from the lockset are then inserted through the openings 40 in the second flange 16 to firmly attach the drilling guide 10 to the edge 204 of the door 200. If desired, small pilot holes may be drilled through the openings 40 before inserting the screws 42. Once the drilling guide is mounted in place, the appropriately sized holesaws 100 and 102 may be used to drill the properly sized lockset holes in the door 200. The right cylindrical walls 22 and 32 of the first and second openings 18 and 26, respectively, effectively guide the outer portions of the holesaws 100, 102 during the drilling operation. Once the holes are drilled in the door 200, the user need only remove the screws 42 from the openings 40 to remove the drilling guide 10 from the door 200. The user may then install the lockset and the latch plate using the screws 42 inserted into the previously made openings on the door edge 204.

Figure 10:
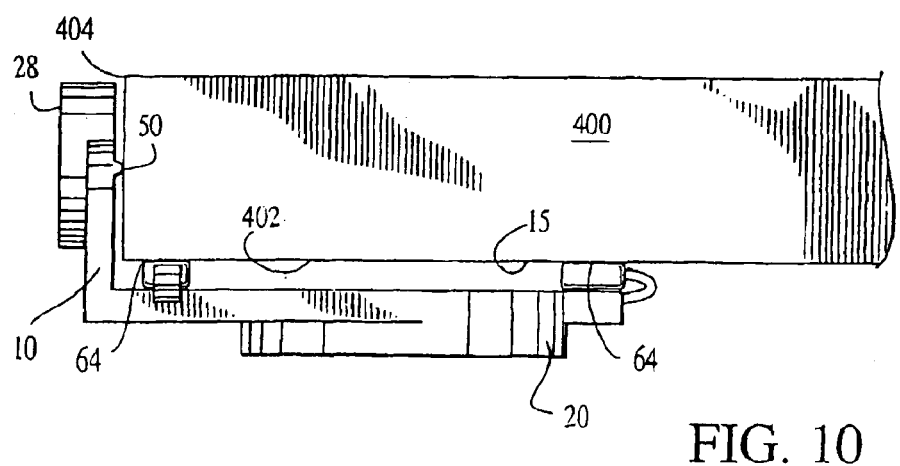
FIG. 10 is a top elevational view similar to FIGS. 3, 8 and 9 showing the drilling guide installed on a door of reduced thickness.

The drilling guide 10 may then be adjusted for use on a door having less thickness than the previous door 200, such as door 400 of FIG. 10. To adjust the drilling guide 10, the user inserts the pegs 66 of the three spacing tabs 60 into the corresponding three openings 68 on the rear face 17 of the second flange 16. The drilling guide 10 is then mounted on the door as shown in FIG. 10, and the same procedures are followed for drilling the holes in the door as described above in conjunction with FIG. 7.

The frame 12 is preferably an integral, one-piece design molded from a rigid and durable plastic material. Exemplary plastic materials include ABS plastic polycarbonate resin such as LEXAN® or hard rubber materials. Also, the frame may be constructed from machined or molded metal, such as aluminum. In addition, the tabs 60 may be formed from rubber or similar flexible material and the tabs 60 may be mated to the frame 12 when the frame 12 is constructed from metal. It is intended that various framing artifacts, such as the bulkhead 13, may vary in position to provide proper support to the frame 12 depending on the particular material being used. In the alternative, such artifacts and bulkheads 13 may be eliminated completely as long as support to the shape of the frame 12 is adequately maintained and depending on the material from which it is constructed.

Of course, it should be understood that a wide range of changes and modifications could be made to the preferred embodiments described above. In particular, some of the specific measurements noted herein may be changed without departing from the invention. Thus, it is intended that the foregoing detailed description be regarded as illustrative rather than limiting. The scope of the invention is defined by the appended claims, and all devise that come within the meaning of the claims, either literally or by equivalence, are intended to be embraced therein.

What is claimed is:

1. A lockset drilling guide, comprising:
   a frame defining an opening in said frame, said frame comprising a first flange and a second flange mounted perpendicularly thereto; and
   a positioning member mounted on said frame, said positioning member movable from a first position to a second position with respect to said frame;
   wherein said positioning member laterally displaces said frame when said positioning member is moved from said first position to said second position.

2. The lockset drilling guide of claim 1, wherein said opening is formed on said second flange.

3. The lockset drilling guide of claim 1, wherein said positioning member laterally displaces said opening along a plane defined by said second flange when said positioning member is moved from said first position to said second position.

4. A lockset drilling guide system for a door having a face and an edge that is perpendicular to said face comprising:
   a frame comprising a first flange that lies adjacent to said face of said door and a second flange mounted perpendicularly thereto and lying adjacent to said edge of said door, said first flange defining an opening;
   a positioning member fixed to said frame, said positioning member moving from a first position to a second position with respect to said frame;
   wherein said positioning member laterally displaces said frame when said positioning member is moved from said first position to said second position.

5. The lockset drilling guide system of claim 4, wherein said positioning member laterally displaces said opening parallel to a plane defined by said second flange when said positioning member is moved from said first position to said second position.

6. The drilling guide system of claim 4, wherein said first flange does not contact said face of said door and said second flange contacts said edge of said door when said positioning member is at said first position.

7. The drilling guide system of claim 4, wherein said first flange contacts said face of said door and said second flange contacts said edge of said door when said positioning member is at said second position.

8. A lockset drilling guide comprising:
   a frame defining an opening in said frame, said opening contained within a plane and said frame comprising a first flange and a second flange mounted perpendicularly thereto; and
   a positioning member mounted on said first flange, said positioning member moving from a first position to a second position with respect to said frame;
   wherein said positioning member laterally displaces said frame within said plane when said member is moved from said first position to said second position.

9. The lockset drilling guide of claim 8, wherein said opening is formed on said second flange.

10. A method of forming a hole in a first door for the placement of a lockset, said method comprising:
    providing a door;
    providing a lockset drilling guide comprising:
       a frame defining an opening in said frame;
       a positioning member that is mounted on said frame movable to either a first position or a second position;
    determining a desired position on said door for forming a hole at said desired position;
    based on said determined desired position, moving said positioning member to one of either the first position or the second position when said lockset drilling guide is mounted to said door at the desired position;
    mounting said lockset drilling guide to said door so that said opening is aligned with said desired position; and
    inserting a drilling tool within said opening and forming said hole by said drilling tool.

11. A lockset drilling guide kit, comprising:
    a frame defining an opening in said frame, said frame comprising a first flange and a second flange mounted perpendicularly thereto;
    a drill bit sized to be received in and guided by said opening; and
    a positioning member mounted on said frame, said positioning member movable from a first position to a second position with respect to said frame;
    wherein said positioning member laterally displaces said frame when said positioning member is moved from said first position to said second position.

12. A lockset drilling guide for a door having a door face and a door edge, comprising:
    a frame comprising a first flange for positioning adjacent the door edge and a second flange mounted perpendicularly to the first flange, said second flange having a face for positioning adjacent the door face, said first flange defining a first opening and said second flange defining a second opening;

a positioning member movable from a first position where it is attached to said face and a second position where it is removed from said face;

wherein said positioning member laterally displaces said frame relative to the door edge when said positioning member is moved from said first position to said second position.

13. The lockset drilling guide of claim 12, wherein said positioning member consists of a spacing tab engageable with said surface when in said first position.

14. The lockset drilling guide of claim 12, wherein said first opening and said second opening are dimensioned to receive and guide drill bits.

15. The lockset drilling guide of claim 13, wherein said spacing tab is permanently attached to said frame.

16. The lockset drilling guide of claim 12, wherein said frame is secured to the door by fasteners engaging the door edge.

17. The lockset drilling guide of claim 12, wherein said first flange defines a mounting opening, said mounting opening used to secure the frame to the door.

18. The lockset drilling guide of claim 17, wherein the mounting opening is located on the first flange so as to align with an opening on latch plate that is part of the lockset.

19. A lockset drilling guide for a door having a first planar face and a second planar ace that is perpendicular to said first planar face, comprising:

a frame defining an opening in said frame, said frame comprising a first flange that lies adjacent to a parallel to said first face of said door and a second flange mounted perpendicularly thereto and lying adjacent to and parallel to said second face, said opening being on said second flange; and a positioning member attached on said first flange by a flexible piece, said positioning member being movable from a first position located between the first flange and the first face of said door to a second position not between the first flange and first face of said door, wherein said positioning member laterally displaces said opening on said second face when said positioning member is moved from said first position to said second position.

\* \* \* \* \*